United States Patent Office /
3,719,754
Patented Mar. 6, 1973

3,719,754
PROCESS FOR PRODUCING INTERFERON-INDUCING PARTICLES AND COMPOSITION CONTAINING SAID PARTICLES
Lawrence E. Day and Lee F. Ellis, Indianapolis, Ind., assignors to Eli Lilly and Company, Indianapolis, Ind.
No Drawing. Filed June 30, 1971, Ser. No. 158,587
Int. Cl. C12d 13/00
U.S. Cl. 424—177    6 Claims

ABSTRACT OF THE DISCLOSURE

Virus-like particles which are obtained from cephalosporin-producing organisms are active in inducing the production of interferon.

BACKGROUND OF THE INVENTION

Interferons are produced by animals and plants, and they function as a defense against viral attack. They are in the nature of proteins and exhibit a facility to inhibit virus replication on a non-specific basis. Once an interferon has been produced, it can protect a host species for short periods of time against local or systemic challenges by many and varied viruses. An interferon has been found to be species specific; in other words, an interferon which has been isolated from one species will not be effective in inhibiting viral attack on another species. Interferons specific to humans have been found to be locally effective on the skin, the eye and in the oral-nasal passages. In order to be effective, the interferon must be available in inhibitory concentrations at the site of challenge.

One method for obtaining quantities of interferon at a site of challenge is to cause its production in the host species by the action of an inducer. Since, as already noted, interferon is species specific, a method which causes the species itself to generate the interferon is highly preferred. Such an inducer normally would be administered at the site of challenge and thereby would cause the host to produce interferon at the point of viral attack.

Generally, an interferon inducer is more efficacious for prophylactic treatment although it has been shown to demonstrate post-infection treatment activity. Statalon, for example, is recognized as an effective interferon inducer, and, when administered intravenously, it can be effective against a virus challenge in the circulatory body fluids such as may arise, for example, through an open wound or the like, and, when administered intranasally, can be effective against influenza or similar intranasally introduced viral disease.

During recent years, virus-like particles possessing interferon-inducing activity have been discovered. The active component of these virus-like particles, found either within or coexistent with these particles, is a doubly stranded ribonucleic acid. These virus-like particles have been found in association with the growth of certain Penicillium species, specifically P. stoloniferum, P. funiculosum, P. chrysogenum, and P. cyano-fulvum.

However, it hitherto has not been recognized that virus-like particles possessing interferon-inducing activity could be produced from organism species other than Penicillium species and exhibiting properties distinct from Penicillium species. Such a discovery forms the basis of this invention.

SUMMARY OF THE INVENTION

This invention is directed to a process for preparing virus-like particles having interferon-inducing activity, which comprises growing a cephalosporin-producing organism in a suitable nutrient medium, collecting the mycelia produced thereby, lysing the mycelial cells and recovering said particles. This invention is directed to the use in preparing virus-like particles of a cephalosporin C-producing organism, and, more specifically, to the use of a *Cephalosporium acremonium*, particular strains of which include ATCC 14553 and ATCC 11550.

Another aspect of this invention is a virus-like particle isolated from a cephalosporin-producing organism, and, specifically, to such a particle isolated from a cephalosporin C-producing organism. More specifically, this invention in another of its aspects, is directed to a virus-like particle isolated from a *Cephalosporium acremonium*, certain strains of which are ATCC 14553 and ATCC 11550.

DETAILED DESCRIPTION OF THE INVENTION

In accordance with this invention, the virus-like particle which is produced is isolated from the mycelia obtained during harvesting of a cephalosporin antibiotic from a cephalosporin producing organism.

The growth of the cephalosporin-producing organism typified specifically by a cephalosporin C-producing organism and more specifically by *Cephalosporium acremonium* can be carried out in a standard manner in surface or submerged culture by intermittent or continuous process. A typical fermentation nutrient medium comprises a nitrogen source and a carbon source, such as a carbohydrate, and the medium can include, for example, corn steep liquor, fish meal, sucrose and peanut meal in sufficient quantities generally to provide about 1,600 milligrams of nitrogen per liter of aqueous suspension. Additional nutrients which can supplant or supplement those listed above include cottonseed protein, meat protein, dried blood, $\alpha$-protein, collagen gluten, egg albumen, nitrates, peptones, yeast, malt extract, ammonium salts, lactose, glycerine, starch, sorbital, maltose, galactose, cerelose, glucose, corn oil, lard oil, methyl oleate, triolein, tripalmitin, cottonseed oil, raw soybean oil, linseed oil and cod liver oil.

The fermentation medium which is prepared generally is adjusted to a pH in the range of about 5.0 to about 7.3, and preferably about 6.9, and then aerated at a rate of about 0.8 to about 1.2 volumes of air volume of medium per minute, preferably at about 1 v./v./m. The medium is inoculaed in the usual manner with a cephalosporin-producing organism and fermentation is initiated at a temperature maintained within the range of about 25° C. to about 30° C., preferably at about 26° C. Fermentation is continued with constant aeration and agitation for a time sufficient to achieve the intended growth, normally for about 48 to about 120 hours. Upon termination of the fermentation stage, the fermentation mixture is separated by a customary method, for example, by filtration, centrifugation, or the like, into an aqueous phase containing the active antibiotic and a residue. The residue from the separation, comprising mycelium and other insoluble materials, serves as starting material for producing the virus-like particle in accordance with the process of this invention.

The residue which contains mycelia generally is first washed with water, after which it is subjected to cell rupture or lysis. This may be accomplished, for example, by freeze grinding the residue, by subjecting the residue to high frequency soundwaves in the presence of glass beads or the like, by lytic enzymes, or by maceration by extrusion through a French pressure cell, a Ribi cell fractionator (Ivan Sorvall, Inc., Norwalk, Conn.), or a like cell rupturing device, such as a high speed bladed mill.

Upon achieving lysis, the cellular debris which results is removed by a customary method such as filtration or centrifugation followed by decantation. The resulting filtrate or supernatant is subjected to ultracentrifugation in the presence of a gradient menstruum, such as one comprised of about 30 percent (d.=1.128), to about 55 percent (d.=1.262) aqueous sucrose solution. The virus-like particles are found to reside in the 48 percent level (d.=1.22).

Of course, other gradient menstrua are equally appropriate for use, such as, for example, a menstruum comprising an aqueous cesium chloride gradient.

Other methods of isolation and purification of the virus-like particles can be employed. These include diffusion through agar or the like, band or rate sedimentation, filtration through molecular sieves, phase separation, selective sedimentation with organic materials, for example, alcohol with or without a salt, dialysis using a suitable membrane, such as stretched cellophane, or the like.

The virus-like particles produced from cephalosporin-producing organisms are about 35 m$\mu$ in diameter as measured by electron microscopy of shadowed or negatively stained preparations. They appear hexagonal with a capsomeric structure, exhibiting therefore a cubic symmetry. The isopycnic density of the particles measured using sucrose solution is 1.22. Based on the assumption that protein density is 1.18 and nucleic acid density is 1.50, the virus-like particles of this invention possibly contain about 13 percent nucleic acid.

If desired, the virus-like particle of this invention having antiviral and interferon-inducing activity can be formulated so as to be administrable in combination with one or several pharmaceutical vehicles or excipients making the particle suitable, for example, for oral, local or enteric administration. Likewise, the interferon-inducer may be used in combination with other noninterfering therapeutic agents, for example, appropriate anti-inflammatory agents.

The interferon-inducer of this invention can be prepared for oral administration using any of the customary forms, including, for example, lozenges, chewing gum, capsules, tablets and medicinal candy. Other standard vehicles may likewise be employed, such as starches, sugar, gelatins, etc., together with suitable formulating agents, such as stabilizers, coating and coloring agents. The preparations may also be in liquid form such as syrups, elixirs, solutions, suspensions, emulsions, etc.

Preparations suitable for local application may likewise be prepared, These include preparations for application to mucous membranes of the nose and throat in liquid form for spraying, gargling, use as drops, painting the throat, etc. Forms useful for treatment of the eyes can also be made available, such as standard ophthalmic preparations or eye washes. Lotions, creams, ointments, etc., are also suitable preparative forms.

Parenteral preparations can be formulated in the form of suspensions, emulsions, solutions, or powders designed for reconstitution prior to use.

The pharmaceutical formulations administratable in any of the above forms must contain a sufficient quantity of virus-like particles to produce effective amounts of interferon. To be effective, the dose which is administered should be sufficiently concentrated to contain at least about $10^8$ virus-like particles, and preferably, about $10^{10}$ virus-like particles. Dosage sizes are thus based upon the number of particles present in the preparation to be administered, and the concentration of the preparation will normally be such that a convenient dosage size will administer an effective number of interferon-inducing particles.

The cephalosporin-producing organism can be grown in any suitable nutrient medium and under any conditions recognized in the art. Typical fermentation conditions include inoculating a suitable nutrient medium with the strain of *Cephalosporium acremonium* and incubating the inoculated medium at a temperature of about 27° C. with agitation and aeration at the rate of about 0.36 cubic feet per minute for the first six hours and 0.55 cubic feet per minute for the balance up to a total generally of about fifty-six hours. The culture is then harvested by centrifugation and the *Cephalosporium acremonium* mycelia are recovered.

The following are typical of the nutrient media which are used in growing the cephalosporin-producing organism:

(A)

| | Percent |
|---|---|
| Peanut meal | 3.5 |
| Soybean meal | 3.5 |
| Beet molasses | 3.5 |
| Methionine | 0.75 |
| $CaCO_3$ | .58 |
| Methyl oleate | .58 |
| Lard oil | 2.30 |

(B)

| | Percent |
|---|---|
| Peanut meal | 4.5 |
| Soybean meal | 2.5 |
| $CaCO_3$ | .58 |
| Methionine | .75 |
| Lard oil | 5.0 |
| Methyl oleate | .58 |

Once the cephalosporin-producing organism has been grown and recovered from the nutrient medium, the mycelia are ready for treatment to obtain the virus-like particles. In a typical procedure, these particles are obtained by suspending the mycelia in an aqueous buffered solution at a pH of from about 7.0 to about 8.0. The suspension of mycelia in the buffered solution is then lysed to free the contents of the cells. The mixture containing cell debris is separated, generally by centrifugation, to isolate the debris from the liquid. The liquid, free of debris, is then collected, and the virus-like particles are isolated from this portion by means of a density gradient which isopycnically bonds the particles at a particular density level of the mixture.

Virtually any buffering agent may be used in the aqueous buffered solution so long as it will afford and maintain a pH of from about 7.0 to about 8.0. Typical buffering agents include phosphates, citrates, and salts of ethylene-diamine tetraacetic acid.

The following examples illustrate the preparation of the virus-like particles of this invention and demonstrate the activity of such particles in inducing interferon which is effective in combatting viral attack.

ISOLATION OF VIRUS-LIKE PARTICLES

About 50 grams of *Cephalosporium acremonium* cells obtained during production of a cephalosporin antibiotic were suspended in an aqueous 0.01 N phosphate solution containing 0.1 percent thioglycolic acid. A minimum amount of the phosphate solution was used, sufficient only to produce a thick paste. The cell paste was passed through a French press to rupture the cells, and the resultant mixture was centrifuged at 1500 r.p.m. The supernatant fluid, about 14.4 milliliters, was placed in a 1 x 3.5-inch polycarbonate tube and cooled to about 4° C. About 5 milliliters of a 55 percent aqueous sucrose solution was added and the mixture was centrifuged in a Beckman No. 30 rotor centrifuge for about two hours at 26,000 r.p.m. The resultant mixture contained an interface dividing the sucrose solution and the supernatant. The portion in the region of and including the interface was removed, and sufficient water was added to produce a density equivalent to that of a 25 percent surcose solution. This mixture was then placed into a 1 x 3-inch polycarbonate tube and about 7 milliliters each of a 35 percent aqueous sucrose solution, a 45 percent aqueous sucrose solution, and a 55 percent aqueous sucrose solution were added in the stated order. Each of these sucrose solutions was carefully added to the polycarbonate tube by pouring the solution down the inner wall of the tube and permitting it thereby to locate itself at the bottom of the tube with minimum intermixing with the other contents of the tube. Thus, the final contents of the polycarbonate tube consisted of several layers. The bottom layer comprised the 55 percent sucrose solution. Immediately above the bottom layer was the 45 percent sucrose solution, and above that the 35 percent sucrose solution. The top layer comprised the mixture which previously had been adjusted to a density equivalent to that of a 25 percent sucrose solution. The entire composite was centrifuged for about eighteen hours at 24,000 r.p.m. using a Beckman SW 25 rotor centrifuge. At the end of this period the contents of the tube were separated into ten approximately equal fractions by puncturing the bottom of the tube and permitting the contents to drain successively into ten separate containers. The refractive index of each fraction was taken and the approximate sucrose concentration determined thereby. Those fractions having a sucrose concentration of approximately 48 percent were dialyzed to remove the sucrose content. Particle counts of these fractions were determined by electron microscopy, and it was found that the third fraction withdrawn from the polycarbonate tube contained the highest concentration of virus-like particles, approximately $10^{10}$ particles per milliliter.

INTERFERON-INDUCING ACTION

Each of three mice were injected with 1.7 milliliters of the above-obtained Fraction 3 containing approximately $10^{10}$ particles per milliliter. After twenty-four hours elapsed, the mice were bled and their serum was collected. The mouse serum was diluted with a commercially available Medium 199 at $\log_{10}$ increments of 1.5, 2.0, 2.5, 3.0 and 3.5.

Concurrently, in several small flasks, mouse L-cells were grown for a forty-eight hour period, after which time the cell count was about $2 \times 10^6$ per flask. Two flasks were employed for each level of dilution of the mouse serum, including an additional set of two flasks for the purposes of a control, making a total of twelve flasks. Two milliliters of the selected mouse serum dilution level were placed into each of the flasks with the exception of the two flasks being used as controls. All of the flasks were then incubated overnight. The sample of diluted mouse serum was removed and the L-cell layer was rinsed. The L-cells were then challenged with approximately 75 PFU (plaque-forming units) of Vesicular Stomatitis Virus (VSV). The L-cells were maintained in contact with the virus for a period of two hours, after which time the virus challenge was removed and replaced with a layer of agar medium and the mixture incubated for about seventy-two hours. At the end of this period the L-cells were inactivated and stabilized by addition of formaldehyde and sodium acetate and were stained with crystal violet. The number of plaques which formed in each flask was determined and compared with the number of plaques formed in the control flask containing no interferon inhibition. The 50 percent end point, that is, the amount of interferon-containing mouse serum which is necessary to reduce by one-half the activity of the Vesicular Stomatitis Virus, was determined. Such an amount was then equated to one unit of interferon activity. It was found that one milliliter of Fraction 3 produced about 200 units of interferon. It was furthermore noted that the activity of this serum is not linear since a 1:5 dilution ratio of the mouse serum produced 100 units of interferon instead of the expected 40 units.

From the above examples it is evident that the virus-like particles which form the basis of this invention are highly active in inducing the formation of interferon.

We claim:
1. A process for preparing virus-like particles having interferon-inducing activity, which comprises growing *Cephalosporium acremonium* in a suitable nutrient medium, collecting the mycelia produced thereby, lysing the mycelial cells and isolating said particles.

2. The process of claim 1, which comprises growing a strain of *Cephalosporium acremonium* selected from the group consisting of ATCC 14553 and ATCC 11550.

3. The process of claim 1, which comprises:
 (a) growing said *Cephalosporium acremonium;*
 (b) filtering the mycelia from the medium;
 (c) suspending the mycelia in an aqueous buffered solution at a pH of from about 7.0 to about 8.0;
 (d) lysing said mycelia in the buffered suspension;
 (e) separating the suspension into cellular debris and a liquid;
 (f) treating said liquid separated from cellular debris in a density gradient to isopycnically bond the virus-like particles present in said liquid; and
 (g) subdividing the gradient to obtain fractions containing said virus-like particles.

4. The process of claim 3, which comprises using a phosphate salt in the aqueous buffered solution.

5. The process of claim 4, which comprises isolating the virus-like particles in the presence of a sucrose density gradient.

6. An interferon-inducing activity composition containing at least about $10^8$ virus-like particles produced by the process o claim 1 and a pharmaceutical vehicle in an administrable dosage.

References Cited

UNITED STATES PATENTS 3,539,694  11/1970  Niss _____ 195—36 R
3,597,318  8/1971  Sutherland _____ 195—28 N

OTHER REFERENCES

Developments in Industrial Microbiology, vol. 8, published by Garamond/Pridemark Press, pp. 417–423 (1967).

ALVIN E. TANENHOLTZ, Primary Examiner

U.S. Cl. X.R.

195—28 N, 36 R, 1.5; 424—85